(12) United States Patent
Cate et al.

(10) Patent No.: US 11,209,058 B2
(45) Date of Patent: Dec. 28, 2021

(54) SPRING BRAKE ACTUATOR

(71) Applicant: TSE Brakes, Inc., Cullman, AL (US)

(72) Inventors: Darin Cate, Cullman, AL (US); Kok Gaither-Ho, Cullman, AL (US)

(73) Assignee: TSE Brakes, Inc., Cullman, AL (US)

( * ) Notice: Subject to any disclaimer, the term of this patent is extended or adjusted under 35 U.S.C. 154(b) by 190 days.

(21) Appl. No.: 16/688,761

(22) Filed: Nov. 19, 2019

(65) Prior Publication Data

US 2021/0148424 A1 May 20, 2021

(51) Int. Cl.
| | | |
|---|---|---|
| *F16D 65/09* | (2006.01) | |
| *F16D 65/097* | (2006.01) | |
| *B60T 8/42* | (2006.01) | |
| *F16D 49/12* | (2006.01) | |
| *F16D 125/12* | (2012.01) | |

(52) U.S. Cl.
CPC ........ *F16D 65/0972* (2013.01); *B60T 8/4241* (2013.01); *F16D 49/12* (2013.01); *F16D 2125/12* (2013.01); *F16D 2500/31473* (2013.01); *F16D 2500/50866* (2013.01)

(58) Field of Classification Search
CPC .. F16D 65/0972; F16D 49/12; F16D 2125/12; B60T 17/083; B60T 8/4241
See application file for complete search history.

(56) References Cited

U.S. PATENT DOCUMENTS

| | | | |
|---|---|---|---|
| 3,092,032 A | 6/1963 | Bentzinger | |
| 3,659,501 A | 5/1972 | Beard | |
| 4,050,861 A | 9/1977 | Sakai et al. | |
| 4,334,838 A | 6/1982 | Fessler et al. | |
| 4,598,625 A | 7/1986 | Belart | |
| 4,860,640 A | 8/1989 | Ware | |
| 4,936,758 A | 6/1990 | Coble | |
| 4,960,036 A * | 10/1990 | Gummer | B60T 17/083 92/63 |
| 5,105,727 A * | 4/1992 | Bowyer | B60T 17/083 92/63 |
| 5,206,625 A | 4/1993 | Davis | |
| 5,285,716 A | 2/1994 | Thompson | |
| 5,676,531 A | 10/1997 | Muscarella et al. | |
| 5,687,633 A | 11/1997 | Eady | |

(Continued)

FOREIGN PATENT DOCUMENTS

| | | |
|---|---|---|
| CN | 1900548 | 1/2007 |
| GB | 2088525 | 6/1982 |

OTHER PUBLICATIONS

Extended European Search Report for EP 20207338.3, dated May 7, 2021.

*Primary Examiner* — Melanie Torres Williams
(74) *Attorney, Agent, or Firm* — Andrus Intellectual Property Law, LLP

(57) ABSTRACT

A spring brake actuator is for braking a wheel of a vehicle. The spring brake actuator has an axially elongated housing having a parking brake chamber and a service brake chamber; a main compression spring in the parking brake chamber; a flexible diaphragm in the parking brake chamber; and a pressure plate in the parking brake chamber, the pressure plate located axially between the main compression spring and the flexible diaphragm. The flexible diaphragm has a contoured portion that inhibits radial shifting of the pressure plate with respect to the flexible diaphragm.

8 Claims, 6 Drawing Sheets

(56) References Cited

U.S. PATENT DOCUMENTS

| | | |
|---|---|---|
| 5,791,232 A | 8/1998 | Smith |
| 5,829,339 A | 11/1998 | Smith |
| 5,992,297 A | 11/1999 | Plantan et al. |
| 5,996,470 A | 12/1999 | Eady et al. |
| 6,129,004 A | 10/2000 | Smith et al. |
| 6,131,501 A | 10/2000 | Smith et al. |
| 6,314,861 B1 | 11/2001 | Smith et al. |
| 6,349,629 B1 | 2/2002 | Plantan et al. |
| 6,394,462 B1 | 5/2002 | Constantinides et al. |
| 6,405,635 B1 | 6/2002 | Smith et al. |
| 6,453,794 B2 | 9/2002 | Castel et al. |
| 6,536,329 B2 | 3/2003 | Anderson et al. |
| 7,451,690 B2 | 11/2008 | Schrader et al. |
| 8,342,076 B2 * | 1/2013 | Prager .................. B60T 17/083 92/63 |
| 8,453,556 B2 * | 6/2013 | Plantan ................ B60T 17/083 92/63 |
| 8,522,666 B2 | 9/2013 | Anooshian et al. |
| 9,050,958 B2 | 6/2015 | Gaufin |
| 9,297,392 B2 | 3/2016 | Gaufin |
| 10,059,322 B2 | 8/2018 | Gaufin et al. |
| 2006/0051219 A1 | 3/2006 | Becker et al. |
| 2007/0240564 A1 | 10/2007 | Uehara et al. |
| 2012/0006192 A1 | 1/2012 | Rhoads |
| 2014/0260949 A1 | 9/2014 | Ho et al. |
| 2018/0231082 A1 | 8/2018 | Gaufin et al. |
| 2018/0281767 A1 | 10/2018 | Gregoire et al. |
| 2019/0176793 A1 * | 6/2019 | Koelzer ................ B60T 15/54 |

* cited by examiner

SPRING BRAKE ACTUATOR

FIELD

The present disclosure relates to vehicle braking systems, and in particular to pneumatically-operated spring brake actuators for engaging a wheel brake.

BACKGROUND

Trucks, trailers and other vehicles often have pneumatically-operated spring brake actuators, which provide the braking force necessary to stop the vehicle. A brake pedal is positioned on the floor of the vehicle's cab and, upon activation, causes pressurized air from a reservoir to enter the spring brake actuator, which in turn causes a push rod to extend out of the spring brake actuator and activate a wheel brake. The wheel brake typically has brake shoes with a brake lining material that is pressed against a brake drum at the vehicle wheel-end to thereby brake the vehicle. The wheel brake often includes a slack adjustor which turns a cam roller via a camshaft so as to force the brake shoes to engage the brake drum and brake the vehicle. Releasing the pressurized air from the air chamber allows a spring within the air chamber to retract the push rod back to its original position.

U.S. Patent Publication No. 2018/0281767 is incorporated herein by reference and discloses a known spring brake actuator. The spring brake actuator has a push rod assembly with a base located in a service brake chamber and a push rod extending from a service brake chamber. Pneumatic activation of the spring brake actuator causes the push rod to further extend out of the service brake chamber to thereby engage a wheel brake with a wheel of the vehicle. Pneumatic deactivation of the spring brake actuator causes the push rod to retract back into the service brake chamber to thereby disengage the wheel brake from the wheel of the vehicle.

The following U.S. Patents further describe the state of the art and are also incorporated herein by reference in entirety: U.S. Pat. Nos. 10,059,322; 9,297,392; 9,050,958; 8,522,666; 6,394,462; 6,314,861; 6,405,635; 5,791,232 and 5,285,716.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In examples disclosed herein, a spring brake actuator is for braking a wheel of a vehicle. The spring brake actuator has an axially-elongated housing having a parking brake chamber and a service brake chamber; a main compression spring in the parking brake chamber; a flexible diaphragm in the parking brake chamber; and a pressure plate located axially between the main compression spring and the flexible diaphragm. According to the present disclosure, the flexible diaphragm has a contoured portion that advantageously inhibits radial shifting of the pressure plate with respect to the flexible diaphragm.

An assembly for a spring brake actuator for braking a wheel of a vehicle is also provided. The assembly includes the flexible diaphragm for location in a parking brake chamber of the spring brake actuator, and a pressure plate for location between a main compression spring of the spring brake actuator and the flexible diaphragm. The pressure plate has a hub portion, a radially outer diameter, and flange that radially extends from the center column to the radially outer diameter. The flexible diaphragm includes a contoured portion that abuts and wraps around an entirety of the radially outer diameter, at least when the main compression spring is in an extended position, thus inhibiting radial shifting of the pressure plate with respect to the flexible diaphragm.

BRIEF DESCRIPTION OF THE DRAWINGS

Examples of exercise machines are herein disclosed with reference to the following drawing figures. The same numbers are used throughout to reference like features and components.

DETAILED DESCRIPTION

Figure 1:
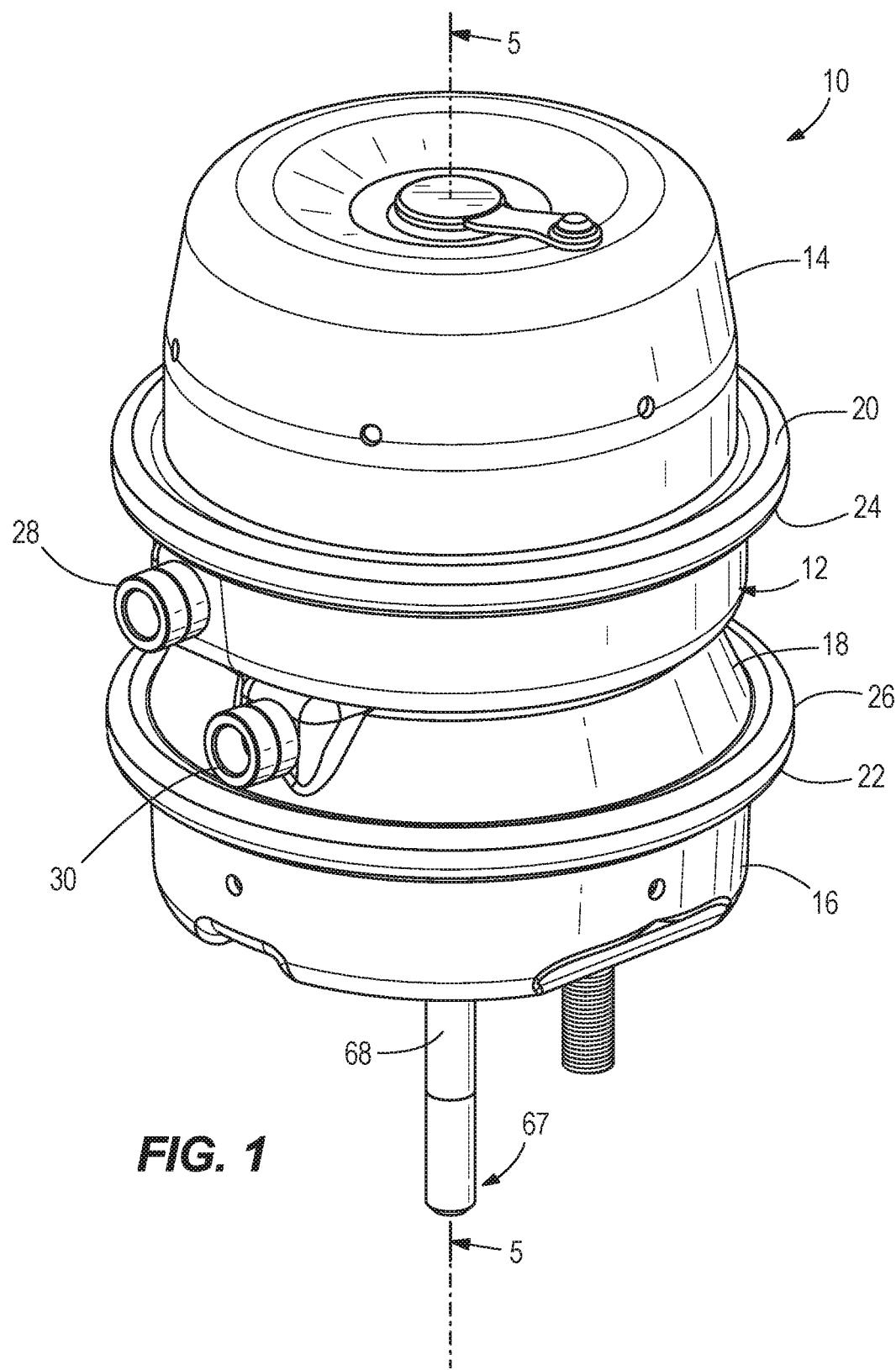
FIG. 1 is a perspective view of a spring brake actuator according to the present disclosure.
Figure 2:
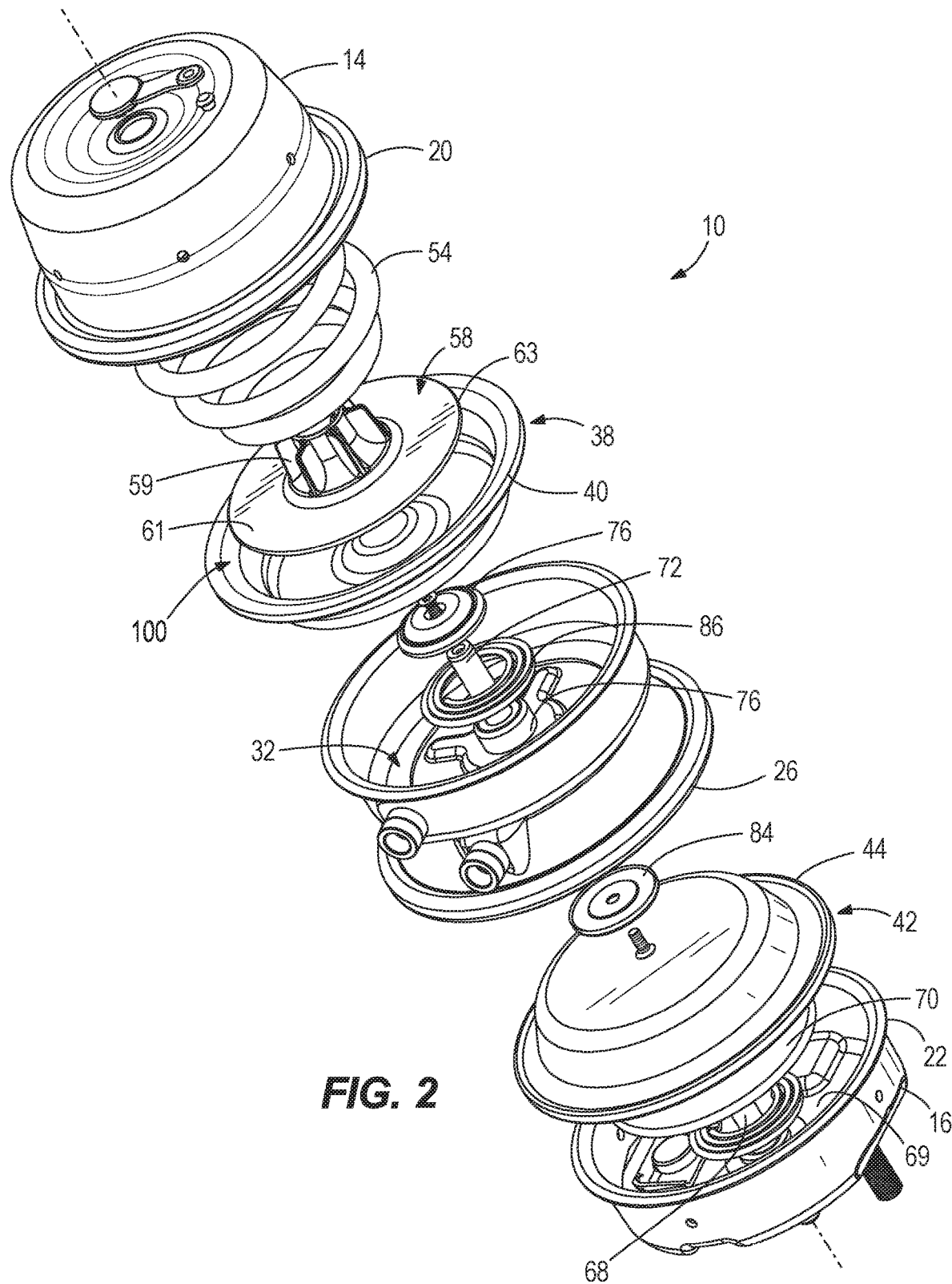
FIG. 2 is an exploded view of the spring brake actuator.

FIG. 1 depicts a spring brake actuator 10 for braking a wheel of a vehicle. The spring brake actuator 10 has an axially elongated housing 12 formed by opposing cup-shaped end portions 14, 16, and an intermediate portion 18 located axially between the cup-shaped end portions 14, 16. The cup-shaped end portions 14, 16 have perimeter flanges 20, 22, respectively, that are engaged in sealing relationship with opposing perimeter flanges 24, 26, respectively, on the intermediate portion 18. Ports 28, 30 are located on the intermediate portion 18 and are configured to admit and release compressed air to and from the housing 12 during operation of the spring brake actuator, as will be described further herein below.

Referring to FIGS. 2 and 5-7, the intermediate portion 18 has an inner wall 32 that bifurcates the interior of the housing 12 into a parking brake chamber 34 and an opposing service brake chamber 36. A flexible diaphragm 38 is located in the parking brake chamber 34 and has a radially outer diameter 40 that is clamped and compressed between the perimeter flanges 20, 24 of the cup-shaped end portion 14 and intermediate portion 18. A flexible diaphragm 42 is located in the service brake chamber 36 and has a radially outer diameter 44 that is clamped and compressed between the perimeter flanges 22, 26 of the cup-shaped end portion 16 and intermediate portion 18. The flexible diaphragm 38 divides the parking brake chamber 34 into upper and lower cavities 46, 48. The flexible diaphragm 42 divides the service brake chamber 36 into upper and lower cavities 50, 52.

A main compression spring 54 is located in the upper cavity 46 of the parking brake chamber 34 and has a first end compressed against the inner end wall 56 of the cup-shaped end portion 14 and an opposite second end compressed against a pressure plate 58, which is located axially between the main compression spring 54 and the flexible diaphragm 38. The pressure plate 58 has a hub portion 59 and a radial flange 61 that extends from the hub portion 59 to a radially outer diameter 63. The opposite, second end of the main compression spring 54 encircles the hub portion 59 and abuts the radial flange 61.

A push rod assembly 60 has a first end portion 65 abutting the flexible diaphragm 38 and an opposite, second end portion 67 extending out of the service brake chamber 36. The second end portion 67 is pivotably coupled to a lever arm 64 of a conventional slack adjuster or cam roller, a portion of which is shown in the drawings. The slack adjuster and/or cam roller is configured to translate reciprocal movement of the push rod assembly 60 to a cam roller and wheel brake for the vehicle, as is conventional and thus not further described herein. The type and configuration of push rod assembly can vary from that which is shown. In the illustrated example, the push rod assembly 60 includes a rod 68 that is located in the lower cavity 52 of the service brake chamber 36, and extends through a centerhole in the end wall 69 of the cup-shaped end portion 16. Thus, the rod 68 is disposed partially inside and partially outside of the service brake chamber 36. A radial end flange on the rod 68 forms a pressure plate 70 that abuts the flexible diaphragm 42 so that, as will be described further below, as the flexible diaphragm 42 flexes back and forth in the chamber, the rod 68 reciprocates further out of and back into the lower cavity 52 of the service brake chamber 36.

The push rod assembly 60 further includes an extension rod 72 that extends through centerhole in the inner wall 32 of the intermediate portion 18 of the housing 12, and particular though a boss 76 containing O-ring seals 78 forming an airtight seal along the slideable extension rod 72. An end plate 80 is coupled to one end of the extension rod 72 by a fastener. The end plate 80 abuts the flexible diaphragm 38 opposite the pressure plate 58. An end plate 84 is coupled to the opposite end of the extension rod 72 by a fastener. The end plate 84 abuts the flexible diaphragm 42 opposite the pressure plate 70. The pressure plate 58 has a center cavity 71 in which the end plate 80 nests so as to effectively mate the end of the extension rod 72 and the pressure plate 58, with the flexible diaphragm 38 sandwiched there between. A return spring 86 is located in the lower cavity 48 of the parking brake chamber 34 and has a first end compressed against the end plate 80 and an opposite, second end compressed against the inner wall 32 of the intermediate portion 18 of the housing 12. A return spring 88 is located in the lower cavity 52 of the service brake chamber 36 and has a first end compressed against the pressure plate 70 and an opposite, second end compressed against the inner end wall 69 of the cup-shaped end portion 16.

Figure 5:
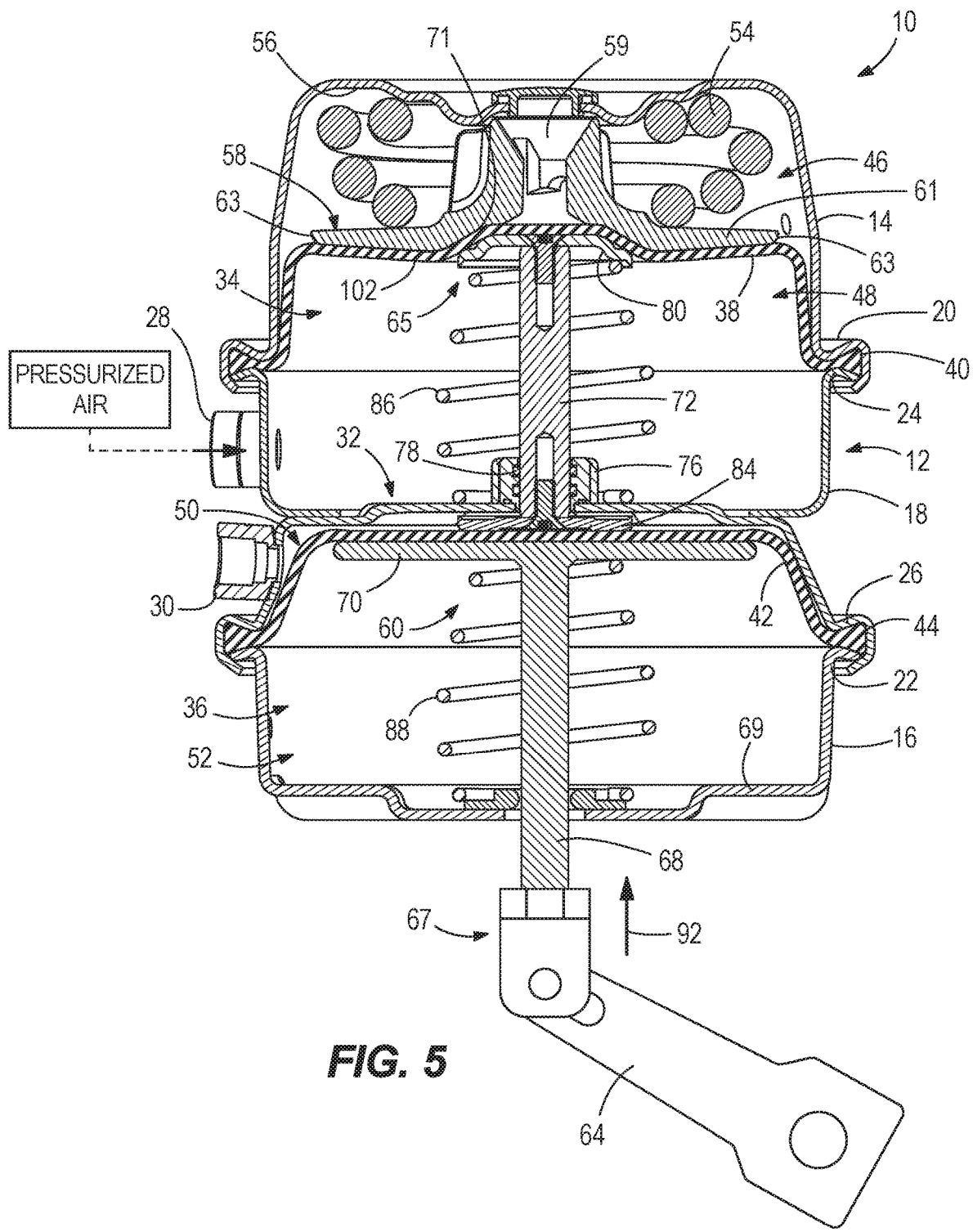
FIG. 5 is a sectional view showing the spring brake actuator with its parking brake chamber in a pressurized condition.
Figure 6:
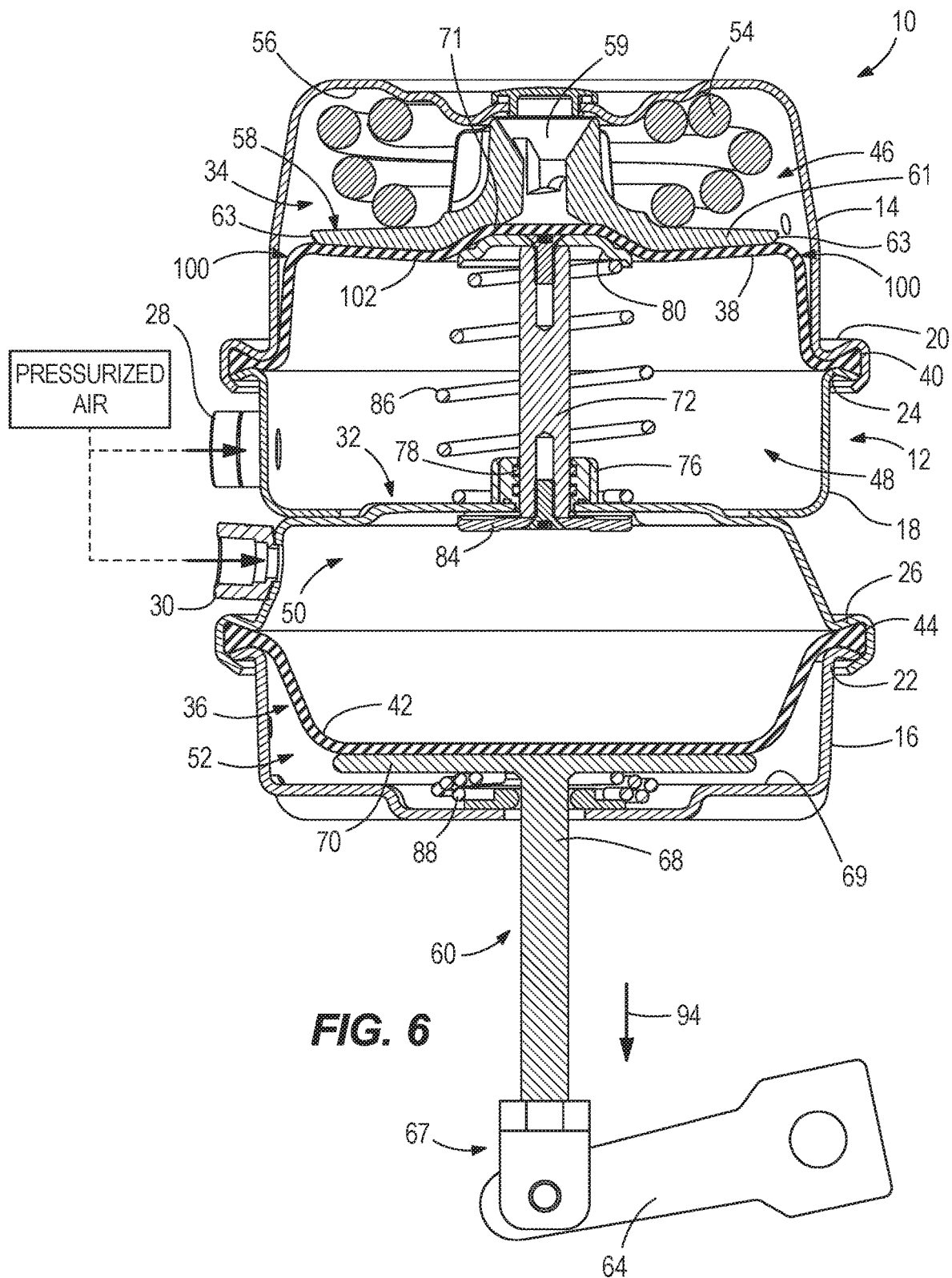
FIG. 6 is a sectional view showing the spring brake actuator with both of its parking brake chamber and service brake chamber in a pressurized condition.
Figure 7:
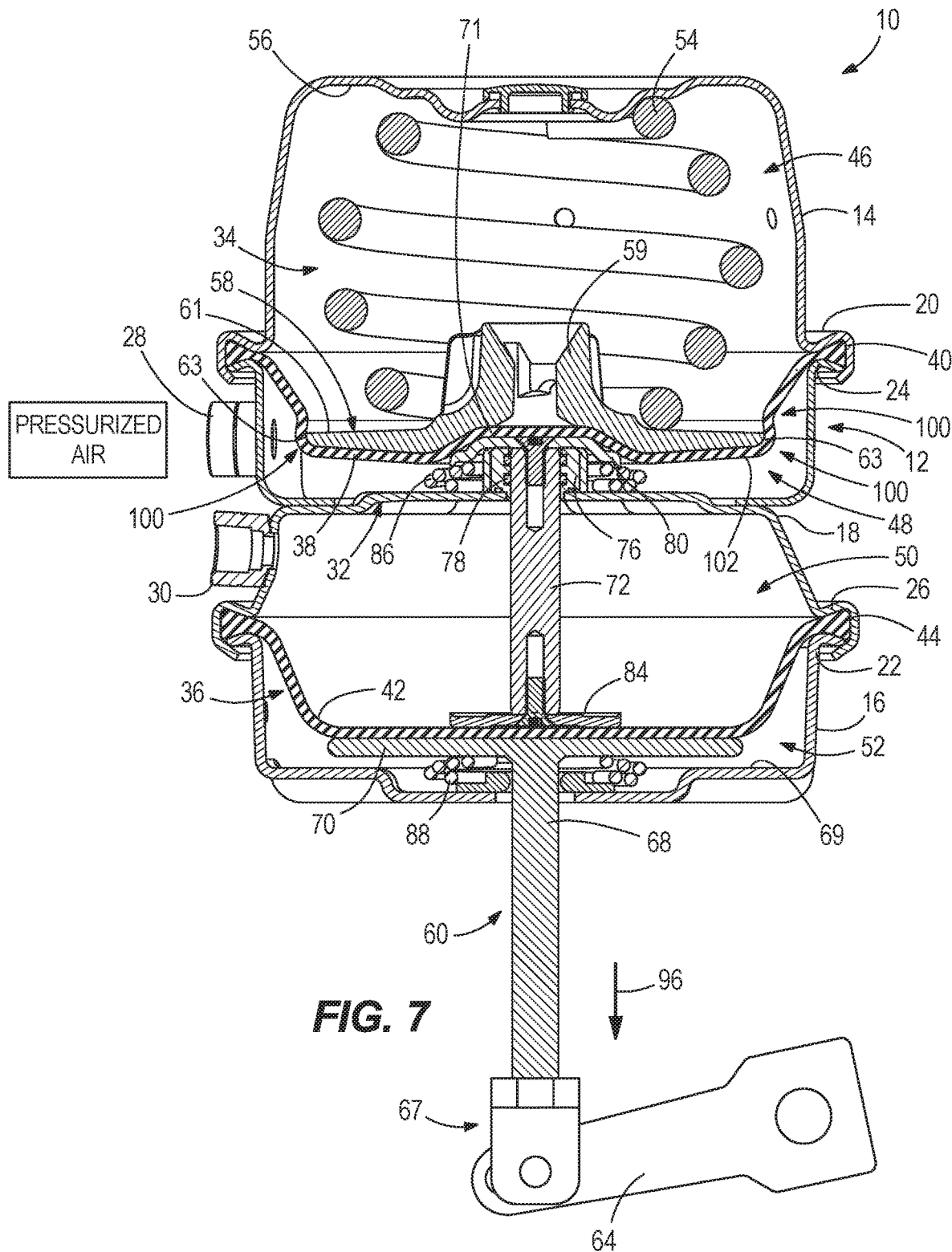
FIG. 7 is a sectional view showing the spring brake actuator with the main compression spring engaged and neither the parking nor the service brake chambers in a pressurized condition.

FIGS. 5-7 depict the spring brake actuator 10 during various operational states. FIG. 5 depicts the spring brake actuator 10 in a state where the wheel brake is released and the vehicle may be driven. Pressurized air is provided via the port 28 to the lower cavity 48 of the parking brake chamber 34. The air pressure pushes the flexible diaphragm 38 upwardly in the figure, thereby compressing the main compression spring 54 and retracting the extension rod 72 into the lower cavity 48, as shown. The return spring 88 pushes the flexible diaphragm 42 upwardly in the figure, thereby retracting the rod 68 into the lower cavity 52 of the service brake chamber 36, as shown at arrow 92.

FIG. 6 depicts the spring brake actuator 10 in a state where the vehicle driver presses down on the vehicle wheel brake pedal, which causes pressurized air to be provided via the port 30 to the upper cavity 50 of the service brake chamber 36. This causes the flexible diaphragm 42 to move downwardly in the drawing, compressing the return spring 88. As a result, the rod 68 is moved downwardly in the figure, as shown by arrow 94, outwardly relative to the lower cavity 52 of the service brake chamber 36, thus pivoting the lever arm 64 of the slack adjuster or cam roller and causing the wheel brake to be applied.

FIG. 7 depicts the spring brake actuator 10 in a state where the vehicle is off and/or air is otherwise evacuated from the housing 12. When this occurs, the main compression spring 54 pushes downwardly in the figure against the pressure plate 58, thus pushing the push rod assembly 60 downwardly in the figure, as shown at arrow 96, so that the wheel brakes are applied. The spring break actuator 10 can be used in conjunction with a variety of conventional brake assemblies, including both brake drum assemblies and brake disc assemblies.

Thus, pressurizing parking brake chamber 34 compresses the main compression spring 54 to thereby retract the push rod assembly 60 back into the service brake chamber 36 and disengage the noted wheel brake from the wheel of the vehicle. Depressurizing the parking brake chamber 34 allows the main compression spring 54 to move the push rod assembly 60 out of the service brake chamber 36 to thereby engage the wheel brake with the wheel of the vehicle.

Through research and experimentation, the present inventors have sought to improve upon conventional spring brake actuators of all makes and models, and in particular to provide an improved spring brake actuator that is less subject to wear over time and thus more robust and longer-lasting than the prior art. Through research and experimentation, the present inventors have determined that the flexible diaphragm located in the parking brake chamber is a component that can wear down over time. This can cause in a reduction in performance, including for example permitting a displacement (i.e., a radial shifting) of the pressure plate with respect to the diaphragm. Displacement of the pressure plate can make it difficult to efficiently service the brake actuator, for example by preventing manual access to the pressure plate with a release bolt. Through further research and experimentation, the present inventors determined that it would be possible to prevent displacement of the pressure plate by securing it to the diaphragm with one or more adhesives. However the inventors have also found that application of adhesives is labor-intensive and must be applied under closely-monitored conditions. The present inventors further realized it would be possible to prevent this radial shifting by mechanically affixing the pressure plate to the diaphragm with one or more fasteners. However, again, installation of fasteners is labor intensive and thus costly.

The present disclosure is a result of the present inventors' realization of the above-described design challenges and their efforts to provide an improved, more robust and long-lasting spring brake actuator that is less costly to manufacture and also less subject to the effects of wear over time, particularly wear of the diaphragm in the parking brake chamber and a resulting displacement of the pressure plate with respect to the diaphragm.

Figure 3:
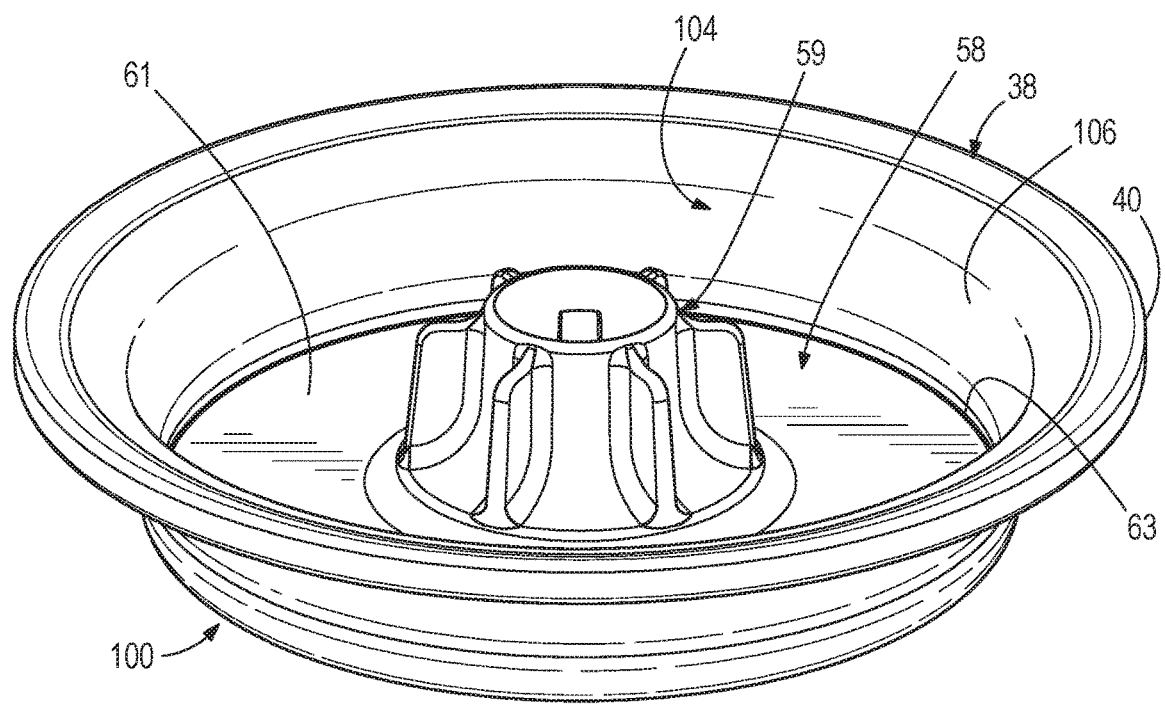
FIG. 3 is a perspective view of an assembly for the spring brake actuator, including a flexible diaphragm and pressure plate.
Figure 4:
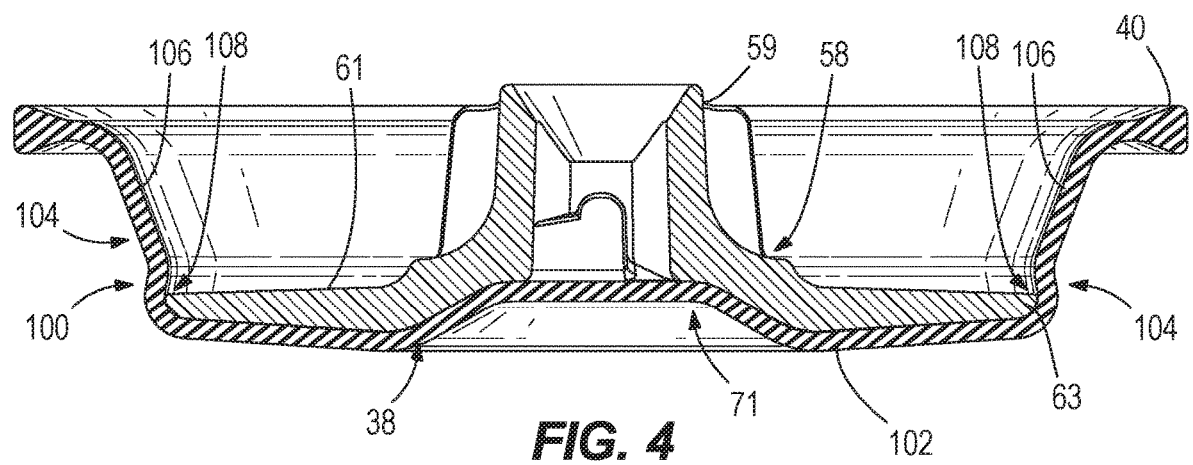
FIG. 4 is a sectional view of the flexible diaphragm.

FIGS. 3 and 4 depict the flexible diaphragm 38 according to the present disclosure, removed from the spring brake actuator 10 and in a relaxed, natural state. According to the present disclosure, the flexible diaphragm 38 has a novel contoured portion 100 that advantageously inhibits the above-described radial shifting of the pressure plate 58. More specifically, the flexible diaphragm 38 has a radial center portion 102 that axially abuts the pressure plate 58 and an intermediate portion 104 located radially between the outer diameter 40 of the flexible diaphragm 38 and the radial center portion 102. The intermediate portion 104 has an angular sidewall 106 that radially inwardly funnels from the radially outer diameter 40 to the contoured portion 100. The contoured portion 100 is located along the intermediate portion 104 and defines a pocket 108 (see FIG. 4) in which the radially outer diameter 63 of the pressure plate 58 is disposed.

As shown by comparison of FIGS. 5-7, the contoured portion 100 will deform during movement of the main compression spring 54 into and between its compressed position (FIG. 5) and its extended position (FIG. 7). As shown by comparison of FIGS. 5 and 7, movement of the main compression spring from the compressed position to the extended position causes the flexible diaphragm 38 to axially invert relative to the radially outer diameter 40 of the flexible diaphragm 38. In certain embodiments, when the main compression spring 54 is fully compressed, the contoured portion 100 becomes deformed such that the pocket 108 changes from a concave shape (see FIGS. 4 and 7) in which the outer diameter 40 is nested, to a convex shape (see FIGS. 5-6) forming a radially outer shoulder of the extended flexible diaphragm 38. However, at least when the main compression spring 54 is fully compressed, the contoured portion 100 advantageously inhibits radial shifting of the pressure plate 58 with respect to the flexible diaphragm 38. When the main compression spring 54 is extended (FIG. 7), the pocket 108 abuts and wraps around an entirety of the radially outer diameter. That is, the contoured portion 100 abuts the entirety of the radially outer diameter 40, or radially outer side surface 40, thereby inhibiting the aforementioned radial shifting.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A spring brake actuator for braking a wheel of a vehicle, the spring brake actuator comprising an axially elongated housing having a parking brake chamber and a service brake chamber, a main compression spring in the parking brake chamber, a flexible diaphragm in the parking brake chamber, and a pressure plate located between the main compression spring and the flexible diaphragm, wherein the flexible diaphragm comprises a contoured portion that inhibits radial shifting of the pressure plate with respect to the flexible diaphragm;

wherein the main compression spring is axially movable into and between a compressed position and an extended position, wherein the pressure plate has a hub portion and a radial flange that is planar and radially extends from the hub portion to a planar radially outermost diameter, and wherein the contoured portion abuts the planar radially outermost diameter of the pressure plate, at least when the main compression spring is in the extended position, thereby inhibiting the radial shifting of the pressure plate;

wherein the flexible diaphragm comprises a radially outermost diameter that is sealed to perimeter of the parking brake chamber, and wherein movement of the main compression spring from the compressed position to the extended position causes the flexible diaphragm to invert relative to the radially outermost diameter of the flexible diaphragm;

wherein the flexible diaphragm comprises a radial center portion that axially abuts the radial flange of the pressure plate and an intermediate portion located radially between the radially outermost diameter of the flexible diaphragm and the radial center portion, and wherein the contoured portion is located along the intermediate portion;

wherein the intermediate portion comprises a planar angular sidewall that radially inwardly funnels from the radially outermost diameter of the flexible diaphragm to the contoured portion; and wherein the contoured portion has a uniform thickness and defines a pocket in which the planar radially outermost diameter of the pressure plate is disposed, at least when the main compression spring is the extended position, and wherein the contoured portion wraps around an entirety of the planar radially outermost diameter of the pressure plate at least when the main compression spring is in the extended position and thus inhibits the radial shifting of the pressure plate at least when the main compression spring is in the extended position.

2. The spring brake actuator according to claim 1, wherein the pressure plate is nested within the contoured portion at least when the main compression spring is in the extended position.

3. The spring brake actuator according to claim 1, wherein the flexible diaphragm has a relaxed state upon removal from the housing, and wherein the contoured portion defines the pocket when the flexible diaphragm is in the relaxed state.

4. The spring brake actuator according to claim 1, further comprising a push rod assembly having a first end portion abutting the flexible diaphragm and an opposite, second end portion extending out of the service brake chamber.

5. The spring brake actuator according to claim 1, wherein the main compression spring encircles the hub portion and abuts the flange.

6. The spring brake actuator according to claim 5, wherein the pressure plate comprises a recessed cavity that mates with the first end portion of the push rod assembly and a center portion of the flexible diaphragm.

7. The spring brake actuator according to claim 6, wherein the first end portion of the push rod assembly comprises an end plate disposed in the recessed cavity, such that the flexible diaphragm is sandwiched between the end plate and the recessed cavity of the pressure plate.

8. The spring brake actuator according to claim 4, wherein pressurizing the parking brake chamber compresses the main compression spring to thereby retract the push rod assembly back into the service brake chamber and disengage the wheel brake from the wheel of the vehicle, and wherein depressurizing the parking brake chamber allows the main compression spring to move the push rod assembly out of the service brake chamber to thereby engage the wheel brake with the wheel of the vehicle.

* * * * *